United States Patent [19]

Sylvester

[11] 4,244,236
[45] Jan. 13, 1981

[54] TILT STEERING COLUMN MECHANISM

[75] Inventor: Raymond L. Sylvester, Fort Wayne, Ind.

[73] Assignee: International Harvester Company, Chicago, Ill.

[21] Appl. No.: 42,745

[22] Filed: May 29, 1979

[51] Int. Cl.$^3$ .......................... B62D 1/18; G05G 5/06
[52] U.S. Cl. ...................... 74/493; 74/527; 403/96
[58] Field of Search .............. 74/493, 527; 403/96, 403/98

[56] References Cited

U.S. PATENT DOCUMENTS

| | | | |
|---|---|---|---|
| 1,367,695 | 2/1921 | Gray | 74/493 |
| 2,185,779 | 1/1940 | Tveidt | 74/493 |
| 3,533,302 | 10/1970 | Hansen | 74/493 |
| 3,724,290 | 4/1973 | Burton | 74/493 |
| 3,803,939 | 4/1974 | Schenten | 74/493 |

FOREIGN PATENT DOCUMENTS

| | | | |
|---|---|---|---|
| 1925642 | 5/1969 | Fed. Rep. of Germany | 74/493 |
| 423205 | 4/1911 | France | 403/96 |

Primary Examiner—Allan D. Herrmann
Attorney, Agent, or Firm—Raymond E. Parks; Frederick J. Krubel; F. David AuBuchon

[57] ABSTRACT

A tilt steering column mechanism having two brackets, one of which is connected to a cab frame member and the other of which is connected to a steering column and is slideable within the first bracket upon tilting or pivoting of the steering column about a point remote from the second bracket. The first bracket carries a slideable lock bolt, which is spring-biased in one axial direction, and has a raised frusto-conical portion thereon which cooperates with any one of a number of uniformly spaced frusto-conical receptacles provided in the second bracket. A handle, pivotally mounted to the first bracket, causes the sliding of the lock bolt through the intermediary of a toggle link, which in the dead center position, together with the bias of the spring, holds the frusto-conical portion in the selected frusto-conical receptacle. The steering column is pivoted to predetermined points, corresponding to the frusto-conical receptacle spacing, about a horizontal axis, upon breaking the dead center by locking position of the toggle link by swinging the handle about its pivotal axis and off-setting the handle connected end of the toggle link, thereby causing the lock bolt connected end of the toggle link to move and slide the lock bolt against the bias of the spring and unseat the frusto-conical portions from their respective frusto-conical receptacles.

7 Claims, 2 Drawing Figures

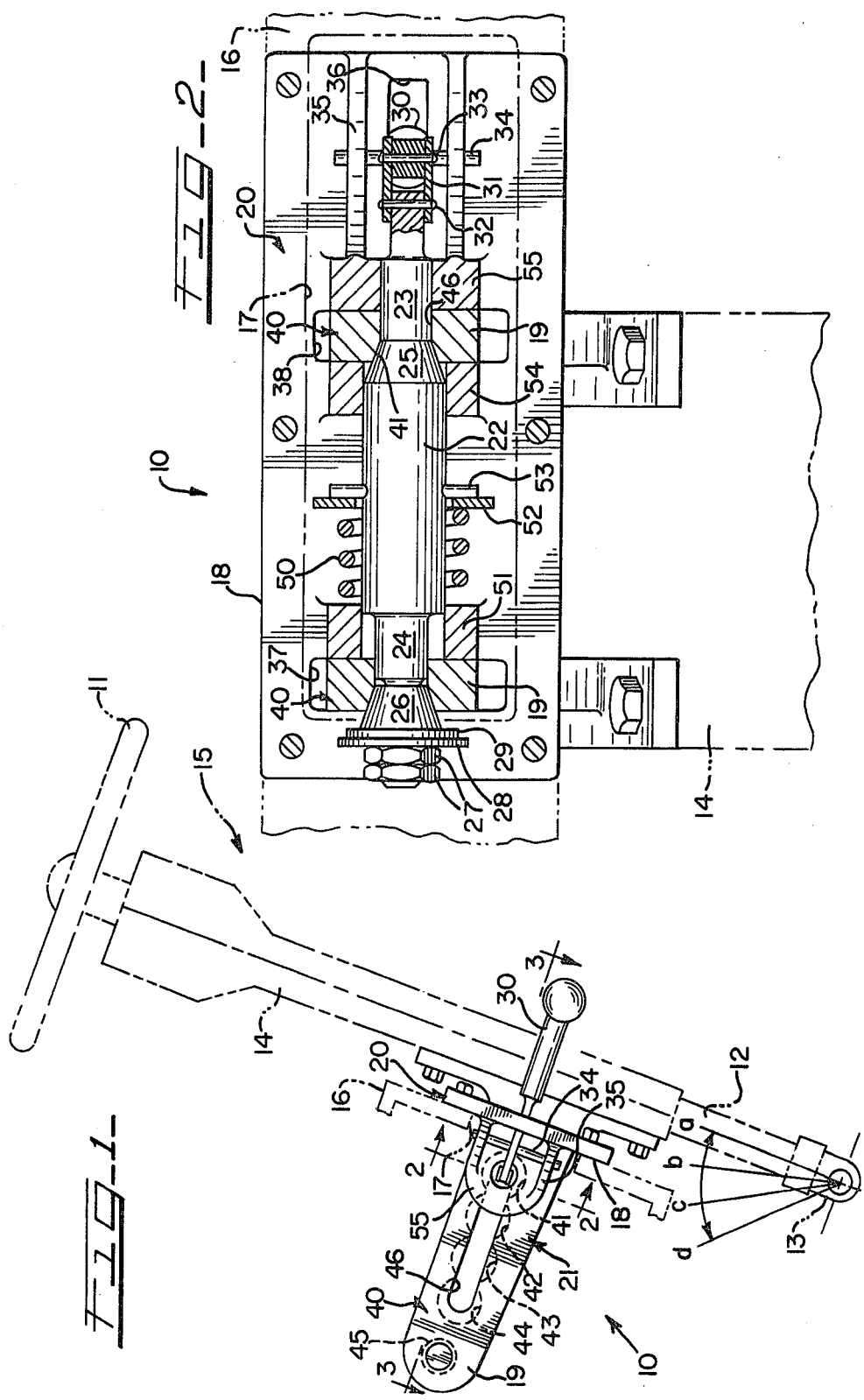

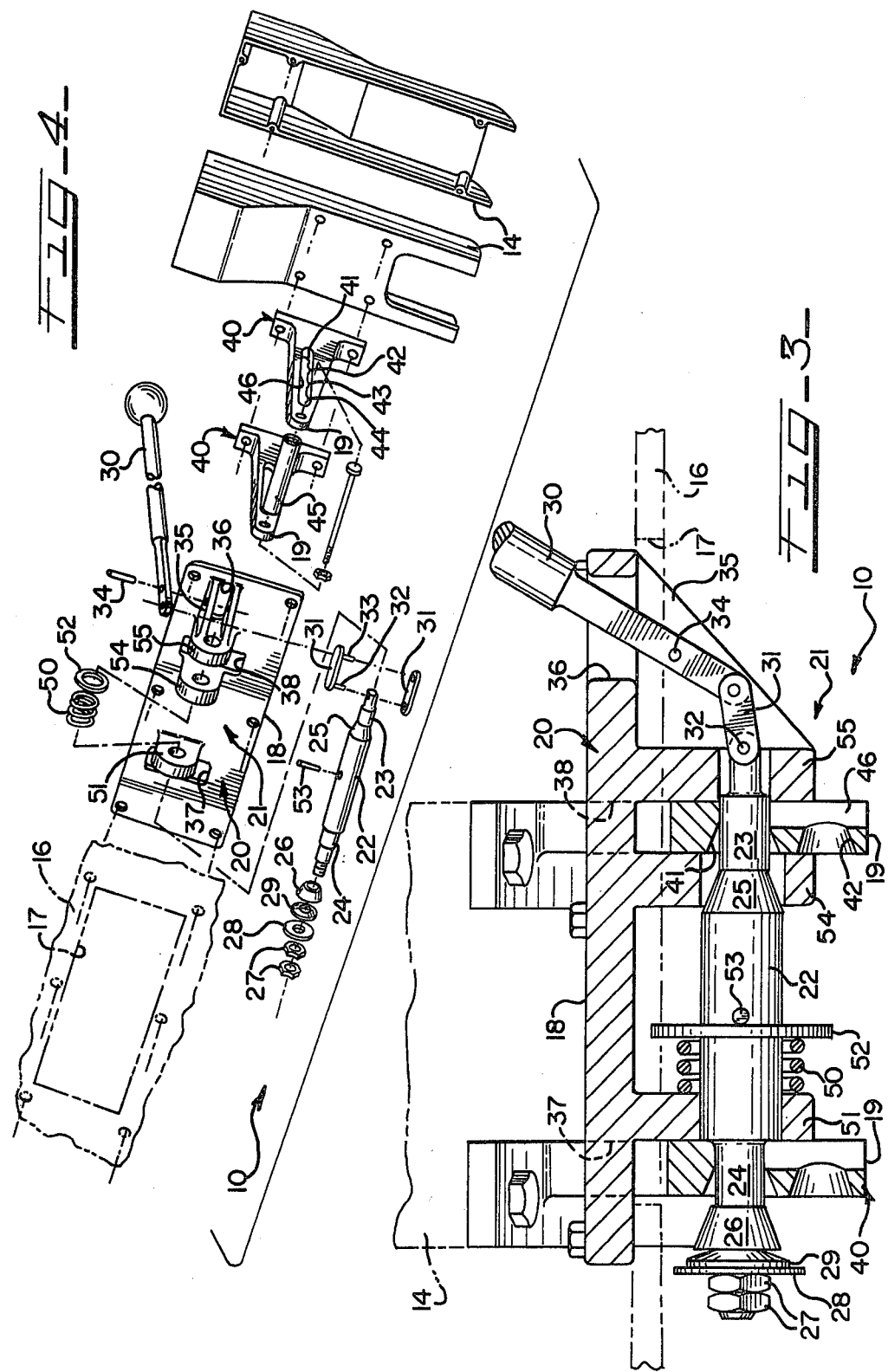

TILT STEERING COLUMN MECHANISM

CROSS-REFERENCE TO A RELATED APPLICATION

An application by Loren G. Sprunger, assignor to the International Harvester Company, concurrently filed with my application, on May 29, 1979, under Ser. No. 42,746, is entitled "TILT STEERING COLUMN MECHANISM" and relates to my invention.

BACKGROUND OF THE INVENTION

My invention relates to a tilt steering column mechanism, for use in a commercial vehicle, in particular in a truck of the cab-over-engine or forward cab variety, which permits the tilting of the steering column in a fore-and-aft direction.

FIELD OF THE INVENTION

Tiltable steering columns have become quite popular, especially for commercial vehicles, such as trucks of the cab-over-engine or forward cab variety, wherein the driver's seat is situated nearly directly above the front axle and the steering wheel is disposed at a slight angle to a horizontal plane. The ability to tilt the steering column greatly enhances the comfort of the driver by permitting the operator to position the steering wheel in a comfortable driving position and by facilitating access to and egress from the driver's station.

BRIEF DESCRIPTION OF THE STATE OF THE ART

My invention is an improvement to the detent type of tilt steering column mechanisms, such as are shown in the following United States Patent Nos.:
4,018,101—Michalic—Apr. 19, 1977;
3,978,740—Selzer—Sept. 7, 1976;
3,718,053—Cinadr—Feb. 27, 1973;
3,691,866—Berkes—Sept. 19, 1972;
3,678,778—Groves—July 25, 1972;
3,628,396—Grobowski—Dec. 21, 1971;
3,533,302—Hansen—Oct. 13, 1970; and
3,412,629—Hill—Nov. 26, 1968.

In the prior structures, a detent mechanism is operable to engage a movable member having a plurality of holes, slots or teeth, each of which corresponds to a separate, discrete position of the steering column. I have provided a handle operated, toggle link actuated, frusto-conical tilt steering column lock mechanism that mechanically locks and unlocks the tilt steering column in one planar pivotal movement as opposed to Michalic which requires two planes of pivotal movement; and one which provides a positive mechanial lock between the slideable bracket on the steering column and the stationary bracket on the vehicle cab frame, rather than the frictional clamping arrangements of Michalic and Hill, or the spring force of Cinadr, or the floating link of Berkes, or the spring force in combination with the release of the Bowden cable of Groves, or the spring force in combination with a pivotable lever of Selzer and Hansen, and one which utilizes the conventional universal connection at the base of the tilt steering column for the tilt axis rather than the special costly bevel gears of Grabowski.

SUMMARY OF THE INVENTION

The tilt steering column mechanism, made in accordance with my invention, makes full use of a conventional fixed steering column assembly and the universal joint at the base thereof which allows the upper end supporting the steering wheel to swing fore-and-aft. Accordingly, my improved tilt steering column mechanism comprises a support bracket means connected to a vehicle cab frame for supporting the steering column above the universal joint connection. A slider bracket means is connected to the steering column and has arm means which pass forwardly through guide opening means provided in the support bracket means for limiting tilting of the steering column to the fore-and-aft direction. Frusto-conical detent means are slideably mounted to the support bracket means and are movable transversely with respect to the steering column for locking the arm means of the slider bracket means to the support bracket means at selected frusto-conical detent receiving means which are provided on one lateral flat side of the arm means which correspond to one of several selectable fore-and-aft tilt positions of the steering column. Spring means are carried on the support bracket means and engage the frusto-conical detent means for moving and pressing the frusto-conical detent means into the selected frusto-conical detent receiving means. A lever means extends rearwardly from an opening provided in the support bracket means and is pivotally connected thereto and is pivotally linked at the end to the frusto-conical detent means for moving the frusto-conical detent means out from the selected frusto-conical detent receiving means against the force of the spring means upon swinging of the lever means about the axis of the pivotable connection.

In particular the support bracket means comprise a base plate fixed to the vehicle cab frame and has three spaced-apart flange members which project forwardly from the base and pass through an opening provided in the vehicle cab frame. The flange members each have at least one flat lateral side positioned at the guide opening means provided in the base plate for the arm means of the slider bracket means. The slider bracket means comprise two identical spaced-apart arm means each having a pedestal fixed to a base on the steering column and each having two parallel lateral flat sides which project forwardly from the pedestal and pass through respective guide opening means in the base plate of the support bracket means and guide along side of the flat lateral sides of the flange members. The arm means each have an elongated slot on the identical lateral flat side and a plurality of uniformly spaced-apart frusto-conical holes on the identical opposite lateral flat side which taper downwardly into the slot. The frusto-conical detent means comprise an elongated locking bar which has two longitudinally spaced-apart frusto-conical portions thereon and is slideably carried in matching transverse bores provided in each of the flat lateral sides of the flange members. The frusto-conical portions each taper downwardly in the same axial direction into an elongated anchor portion of a size which passes through the slot in each arm means thereby anchoring the respective arm means to the flange members of the support bracket means.

Further, one frusto-conical portion is slideably mounted to one end of the locking bar and a resilient connecting means is provided on the one end of the locking bar for resiliently connecting the frusto-conical portion thereto and for axially positioning both frusto-conical portions in respective aligned frusto-conical holes in the arm means. The spring means comprise a compression spring which is sleeved over the locking bar and which has one end contacting one flange member on the side opposite of the flat lateral side and the other end contacting a flat washer which is sleeved over and connected to the bar. The resilient connecting means comprise a pair of jam nuts screwed onto a threaded end portion of the locking bar against a flat washer which abuts a spring washer which in turn abuts the large end of the slideably mounted frusto-conical portion.

Still further, a support bar means is connected to the ends of the two arm means for holding the lateral flat sides in parallel alignment. The lever means is pivotally linked to the locking bar by a toggle link.

In order to tilt the steering column to another position, the frusto-conical portions on the locking bar are unseated from the frusto-conical receiving holes in the slotted arm means of the slider bracket means by moving the locking bar in one axial direction with the handle, after the toggle link is moved from the dead center position, and sliding the slotted arm means of the slider bracket means across the anchor portions of the locking bar by pivoting the steering column about the axis of the universal connection at the base thereof to the selected new position, and then returning the handle to its original position and seating the frusto-conical detent portions in another pair of distinct axially aligned frusto-conical holes which correspond to the newly selected tilted position of the steering column. The toggle link in combination with the spring means assist in seating and holding the frusto-conical detent portions in the various selected distinct pairs of axially aligned frusto-conical detent receiving holes. The toggle link connection blocks the locking bar against axial movement in the dead center position of the toggle link.

BRIEF DESCRIPTION OF THE DRAWING

FIG. 1 is a side elevation view of the tilt steering column mechanism;

FIG. 2 is a partial sectional view of the tilt steering column mechanism taken generally on lines 2—2 of FIG. 1 showing the frusto-conical detent portions on the locking bar seated in the frusto-conical detent receiving holes in the slotted arm means of the slider bracket means;

FIG. 3 is a partial sectional view, similar to FIG. 2, taken generally on lines 3—3 of FIG. 2, which shows the unseated position of the frusto-conical detent portions prior to pivoting the steering column to a newly selected tilted position; and FIG. 4 is an illustration of the major parts of the tilt steering column mechanism, with the omission of minor hardware for the purposes of clarity.

DESCRIPTION OF THE PREFERRED EMBODIMENT

A tilt steering column mechanism is generally designated 10 in the various figures of the drawing. In FIG. 1, a conventional steering column assembly 15 is shown in phantom lines and includes a steering wheel 11, at the top of the steering column 12, the universal joint 13 at the base, and a two-piece steering column base housing 14. A stationary support bracket means 20 is fixed to the cab supported frame 16 and has projecting part means 21 which comprise three laterally spaced apart flanges 51, 54, 55 that extend forwardly through an opening 17 provided in the cab support frame 16. The projecting part means 21, shown in FIGS. 3 and 4, have aligned co-axial bores corresponding in size to the various sizes of the slideable portions on the elongated locking bolt 22. Two spaced-apart anchor portions 23, 24 have sizes corresponding to the width of the slots 46, 46 in the two identical slider bracket means 40,40, which may be constructed from one piece or in two pieces as shown, and anchor the slider bracket means 40,40 to the support bracket means 20. Two frusto-conical detent portion means 25, 26 taper downwardly into the two anchor portions 23, 24. The one frusto-conical portion 26, on the left outboard side of the locking bar 22, is sleeved over a threaded end portion of the locking bar 22, and is resiliently held in place by a pair of jam nuts 27 which abut against a flat disk washer 28, which in turn abuts against a spring washer 29, which abuts against the large side of the slideably mounted frusto-conical portion means 26. The proper seating of the frusto-conical detent portion means 25, 26 in complementary frusto-conical detent receiving holes or receptacles 41, 42, 43 or 44 in the slotted arm means of the slider bracket means 40,40 is controlled by adjusting the jam nuts 27 and the pressure applied on the spring washer 29 pressing against the large end of the slideably mounted frusto-conical portion means 26.

The opposite end of the locking bar 22 is connected to the operating handle 30 by means of a toggle link 31. Pin 32 connects one end of the toggle link 31 to the right outboard side of the locking bar 22, and pin 33 connects the other end of the toggle link to the inner end of the control lever 30. The control lever 30 is pivotally connected by pin 34 to a flange bracket 35 which has legs straddling an opening 36 in the base of the support bracket means. The control lever 30 extends rearwardly through the opening 36 into the vehicle cab.

The slider bracket means 40,40 comprise two identical slotted slider arm means 19,19 each of which have a pedestal fixed to a base 14 on the steering column 12. The arm means 19,19 pass forwardly through complementary guide openings 37, 38 in the base 18 alongside one flat lateral side of each of the three flange members 51, 54, 55 on the support bracket means 20. Since the slotted slider bracket arm means 19,19 are identical only the one on the right will be described in detail. An elongated slot 46 is provided in the projecting arm means 19 which respectively passes over the one anchor portion 23 on the locking bar 22 and is anchored thereby to the two adjacent spaced-apart flanges 54 and 55 on the support bracket means 20. Four uniformly spaced frusto-conical detent receiving holes 41, 42, 43, 44 taper downwardly into the slot 46 and each forms a seat for the right frusto-conical detent portion 25 on the elongated locking bar 22. The identical frusto-conical detent receiving holes in the left arm means 19 also, each form a seat for the left frusto-conical detent portion 26.

A spacer or support rod 45 is connected between the ends of the arm means 19,19 on the slider bracket means 40,40 which adds to the rigidity and parallel alignment of the spaced-apart arm means 19,19.

A spring 50 is sleeved over the mid-section of the locking bar 22 between the left outer and inner flanges 51, 54 and is compressed against the left flange 51 and a flat washer 52 which is anchored to the locking bar 22 by a pin 53 passing diametrically through an opening provided in the locking bar 22.

The dead center position of the toggle link 31 and the compression of spring 50 firmly seats the holds both frusto-conical detent portion means 25, 26 in the one selected axially aligned pair of frusto-conical holes 41, 42, 43 or 44 in the two arm means 19,19, and also compresses the spring washer 29 on the threaded end of the locking bar 22. Also, the dead center position of the toggle link 31 locks the locking bar 22 against axial shifting.

MODE OF OPERATION

In order to pivot the steering wheel 11 to any one of the three other tilted positions b, c, or d, from the a position shown in FIG. 1, handle 30 is pivoted to the left, or clockwise, looking at FIG. 3, to the disengaged position of the locking bar 22. The toggle link 31 is moved from the dead center position and pushes against the pin connected right end 32 of the locking bar 22 thereby shifting the locking bar 22 to the left against the action of the spring 50 until both frusto-conical detent portion means 24, 25 are each unseated from their respective frusto-conical detent receiving holes 41 in the two identical slider bracket arm means 19,19.

The driver or operator now pivots or tilts the steering column 12 to the selected new position about the axis of the universal connection 13. The slot 46 in each of the slider bracket arm means 19,19 slides over the respective anchor portions 23, 24 on the locking bar 22, thereby permitting the slider bracket arm means 19,19 to slide rearwardly along the guide openings 37, 38 in the base 18 of the support bracket means 20 and axially align the frusto-conical detent portion means 25, 26 with the one pair of axially aligned frusto-conical detent receiving holes 42, 43 or 44 corresponding to the selected new tilted position b, c or d of the steering column 12. Once the selected position is reached, the driver or operator returns or pivots the handle 30 counterclockwise back to the engaged position of the locking bar 22 and the dead center position of the toggle link 31. The toggle link 31 in combination with the spring 50 firmly seat, lock and hold the frusto-conical detent portion means 25,26 in the selected pair of frusto-conical detent receiving holes 42, 43 or 44.

The embodiment of the invention in which an exclusive property or priviledge is claimed are defined as follows:

1. An improved tilt steering column mechanism for a steering column tiltable about a universal joint at the base thereof, comprising:
   a support bracket means connected to a vehicle cab frame for supporting the steering column above the universal joint connection;
   a slider bracket means connected to the steering column and having arm means passing forwardly through guide openings provided in the support bracket means for limiting tilting of the steering column to the fore-and-aft direction;
   frusto-conical detent means slideably mounted to the support bracket means and movable transversely with respect to the steering column for locking the arm means of the slider bracket means to the support bracket means at selected frusto-conical detent receiving means provided on one lateral side of the arm means corresponding to one of several selectable fore-and-aft tilt positions of the steering column;
   spring means carried on the support bracket means and engaging the frusto-conical detent means for moving and pressing the frusto-conical detent means into the selected frusto-conical detent receiving means;
   lever means extending rearwardly from an opening provided in the support bracket means and pivotally connected thereto and pivotally linked to the frusto-conical detent means out from the selected frusto-conical detent receiving means against the force of the spring means upon swinging of the lever means about the axis of the pivotal connection;
   the support bracket means comprising a base plate fixed to the vehicle cab frame and having three spaced-apart flange members projecting forwardly therefrom and passing through an opening provided in the vehicle cab frame, the flange members each having at least one flat lateral side positioned at the guide openings provided in the base plate for the arm means of the slider bracket means;
   the slider bracket means comprising two identical spaced-apart arm means each having a pedestal fixed to a base on the steering column and each having two parallel lateral flat sides projecting forwardly from the pedestal and passing through a respective guide opening in the base plate and guiding along side of the flat lateral side of each of the flange members, the arm means each having an elongated slot on the identical lateral flat side and a plurality of uniformly spaced-apart frusto-conical holes on the identical opposite lateral flat sides tapering downwardly into the slot and comprising the frusto-conical detent receiving means; and
   the frusto-conical detent means comprising an elongated locking bar having two axially spaced-apart frusto-conical detent portions thereon slideably carried in matching transverse bores provided in each of the flat lateral sides of the flange members, the frusto-conical detent portions each tapering downwardly in the same axial direction into an elongated anchor portion of a size passing through the slot in each arm means anchoring the respective arm means to the flange members of the support bracket means.

2. The improved tilt steering column mechanism according to claim 1, wherein,
   one frusto-conical detent portion is slideably mounted to one end of the locking bar, and a second spring means acting in opposition to the first spring means is provided on the one end of the locking bar for resiliently connecting the frusto-conical detent portion thereto and for axially positioning both frusto-conical detent portions in respective aligned frusto-conical detent receiving holes in the arm means.

3. The improved tilt steering column mechanism according to claim 2, wherein,
   four uniformly spaced-apart frusto-conical detent receiving holes are provided in each arm means.

4. The improved tilt steering column mechanism according to the claim 2, wherein a support bar means is connected to the ends of the arm means for holding the lateral flat sides in parallel alignment.

5. The improved tilt steering column mechanism according to claim 2, wherein,
   the first spring means comprise a compression spring sleeved over the locking bar and having one end contacting one flange member on the side opposite the flat lateral side and the other end contacting a flat washer sleeved over and connected to the locking bar.

6. The improved tilt steering column mechanism according to claim 2, wherein
the lever means is pivotally linked to the second end of the bar by a toggle link.

7. The improved tilt steering column mechanism according to claim 2, wherein
the second spring means comprise a pair of jam nuts screwed onto a threaded end portion of the one end of the locking bar against a flat washer abutting a spring washer in turn abutting the large end of the slideably mounted frusto-conical detent portion.

* * * * *